US011249750B2

(12) United States Patent
Ahuja

(10) Patent No.: US 11,249,750 B2
(45) Date of Patent: Feb. 15, 2022

(54) IMPLEMENTING A DISTRIBUTED REGISTER TO VERIFY THE STABILITY OF AN APPLICATION SERVER ENVIRONMENT FOR SOFTWARE DEVELOPMENT AND TESTING

(71) Applicant: BANK OF AMERICA CORPORATION, Charlotte, NC (US)

(72) Inventor: Yogi Ahuja, Warwick, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/909,486

(22) Filed: Jun. 23, 2020

(65) Prior Publication Data
US 2021/0397445 A1    Dec. 23, 2021

(51) Int. Cl.
| | | |
|---|---|---|
| G06F 9/44 | (2018.01) | |
| G06F 9/455 | (2018.01) | |
| G06F 9/445 | (2018.01) | |
| G06F 8/71 | (2018.01) | |
| G06F 21/57 | (2013.01) | |
| G06F 11/36 | (2006.01) | |
| G06F 8/65 | (2018.01) | |

(52) U.S. Cl.
CPC ............. *G06F 8/71* (2013.01); *G06F 8/65* (2013.01); *G06F 11/3664* (2013.01); *G06F 11/3668* (2013.01); *G06F 21/57* (2013.01); *G06F 2221/033* (2013.01)

(58) Field of Classification Search
CPC .......... G06F 8/71; G06F 8/65; G06F 11/3664; G06F 11/3668; G06F 21/57; G06F 2221/033
See application file for complete search history.

(56) References Cited

U.S. PATENT DOCUMENTS

| | | |
|---|---|---|
| 10,135,835 B1 | 11/2018 | Kandel et al. |
| 2018/0020045 A1* | 1/2018 | Cook .................... G06F 9/4494 |
| 2018/0285244 A1* | 10/2018 | Subramanian Jayaraman ........... G06F 11/3692 |
| 2019/0004789 A1 | 1/2019 | Mills |
| 2019/0012254 A1* | 1/2019 | Gupta ................. G06F 11/0766 |
| 2019/0236548 A1 | 8/2019 | Singi et al. |
| 2019/0286552 A1* | 9/2019 | Sharma ............... G06F 11/3692 |
| 2019/0303579 A1 | 10/2019 | Reddy et al. |
| 2019/0303623 A1 | 10/2019 | Reddy et al. |

(Continued)

OTHER PUBLICATIONS

K.N. Pankov, Testing, Verification and Validation of Distributed Ledger Systems, Mar. 2020, pp. 1-9. https://ieeexplore.ieee.org/stamp/stamp.jsp?tp=&arnumber=9078541&isnumber=9078537 (Year: 2020).*

(Continued)

*Primary Examiner* — Mongbao Nguyen
(74) *Attorney, Agent, or Firm* — Moore & Van Allen PLLC; James C. Edwards

(57) ABSTRACT

A distributed register/ledger in a distributed trust computing network is the basis for determining the stability of a computing environment. Based on the whether the determined computing environment stability meets predetermined thresholds decisions are made on whether to allow for computing code to be tested within the computing environment or allow for edits/changes to computing code to be checked-in to the code repository.

11 Claims, 6 Drawing Sheets

(56) References Cited

U.S. PATENT DOCUMENTS

| | | | |
|---|---|---|---|
| 2019/0319971 A1* | 10/2019 | Levy | H04L 41/20 |
| 2019/0384594 A1 | 12/2019 | Michiyama et al. | |
| 2020/0026510 A1 | 1/2020 | Adams et al. | |
| 2020/0082117 A1* | 3/2020 | Simmons | G09C 1/00 |
| 2020/0099773 A1* | 3/2020 | Myers | H04L 67/1095 |
| 2020/0142693 A1* | 5/2020 | Neugschwandtner | H04L 9/0637 |
| 2020/0285737 A1* | 9/2020 | Kraus | G06F 21/552 |
| 2020/0349037 A1* | 11/2020 | Landman | G06F 21/44 |
| 2021/0312078 A1* | 10/2021 | Jayachandran | H04L 9/3239 |

OTHER PUBLICATIONS

K. N. Pankov, Testing, Verification and Validation of Distributed Ledger Systems , Apr. 2020, pp. 1-9 https://ieeexplore.ieee.org/stamp/stamp.jsp?tp=&arnumber=9078541 (Year: 2020).*

* cited by examiner

US 11,249,750 B2

IMPLEMENTING A DISTRIBUTED REGISTER TO VERIFY THE STABILITY OF AN APPLICATION SERVER ENVIRONMENT FOR SOFTWARE DEVELOPMENT AND TESTING

FIELD OF THE INVENTION

The present invention relates to a development and testing of computing code, and more particularly to implementing a distributed register/ledger as a source of truth to verify the overall stability of an application server environment for purposes of authorizing computing code development and/or testing.

BACKGROUND

Before releasing new software or upgrades to existing software, the software must undergo extensive testing to ensure that the software will function properly when it is released to a production environment or a commercial market. Testing is conducted within a computing environment that emulates the production environment or a commercial use environment. However, when a tester retrieves or otherwise accesses the software for purposes of testing, the tester is typically unaware of the current state of the computing environment in which the testing is to occur. If the current state of the computing environment is unstable it may result in ineffective testing and/or prohibit, or at least delay, testing. An unstable environment may be caused by a myriad of different factors, such as application servers being unavailable (i.e., commonly referred to as "down"), software not being properly installed on the applications servers and the like.

In certain instances, the tester is cognizant of computing environment instability because they experience the inability to test or delays in testing. In such instances, the tester notifies applicable personnel of the instability and awaits resolution of the problem before proceeding with further testing. In other instances, due to the subtlety of the instability, the tester may of unaware of the problem; however, the testing may prove to be ineffective.

From a software development standpoint, software is developed, or edits are made to existing software on a workstation and subsequently the developer check-ins the code to a code repository. In certain instances, the code may function properly on the developer's workstation; however, once the code is checked-in, due to instability in the computing environment, the code does not function properly on the main servers or the like.

Therefore, a need exists to ensure the stability of the computing environment in which software is tested. In addition, a need exists to ensure that edits/changes to software that is being developed are checked-in to a computing environment that is stable. As a result, the desired systems, methods, computer program products and the like should provide for authorizing code/software testing and check-in code/software development edits only in those instances in which the computing environment is deemed to be stable. Moreover, the desired systems, methods, computer program products and the like should take into account a wide-range of factors when determining whether or not the computing environment is stable.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that provide for determining an acceptable level of computing environment stability before allowing a software tester to test code/software or a software developer to check-in edits to code/software.

Specifically, the present invention leverages the use of a distributed trust computing network in which the various decentralized nodes are each associated with a different entity or factor that has an affect on the computer network stability. The various nodes of the distributed trust ledger will provide status data, which is verified for authenticity through consensus established by a plurality of the nodes and forms the data blocks of a distributed register.

In response to a tester requesting access to computing code/software or a developer requesting the checking-in of computing code/software edits, the distributed register/ledger is accessed to determine the current status of the various nodes and a determination is made as to the overall stability of the computing environment based on the current status of the various nodes. If the computing environment is determined to meet a specified level of overall computing environment stability, the tester is granted access to the code for testing purposes or, in other embodiments of the invention, the developer is allowed to check-in their edits to the code.

Thus, the present invention serves to eliminate the problems that exist when code/software is tested in an unstable computing environment and when edited code/software is checked-in to an unstable computing environment.

A system for assuring computing environment stability for developing and testing computing code defines first embodiments of the invention. The system includes a distributed trust computing network comprising a plurality of decentralized nodes. Each decentralized node is associated with one of a plurality of entities or factors that affect the stability the computing environment. Each decentralized node includes a first memory and at least one first processor in communication with the first memory. The first memory of the decentralized nodes is configured to store a distributed register/ledger comprising a plurality of data blocks. Each data block stores data associated with an operating status of one of the plurality of entities or factors. The distributed trust computing network is configured to certify that the data stored in the data blocks is authentic.

The system additionally includes a code repository including second memory configured to store computing code that is being tested and/or developed.

In addition, the system includes a computing platform that is in network communication with or disposed within the distributed trust computing network. The computing platform include a third memory and at least one second processor in communication with the third memory. The third memory stores instructions that are executable by the second processor. The instructions are configured to receive a first request from a user to retrieve computing code from the code repository for purposes of testing the computing code and, in response to receiving the first request, access the distributed register/ledger to determine a current operating status for each of the plurality of entities associated with the computing environment. Further, the instructions are configured to determine computing environment stability for testing computing code based on the current operating status of each of the plurality of entities associated with the computing environment. In addition, the instructions are further configured to, in response to determining that the computing environment stability meets a first requisite threshold for testing computing code, retrieve the computing code from the code repository and present to the user for purposes of testing the computing code within the computing environment.

In additional specific embodiments of the invention, the instructions are further configured to receive a second request from a user to check-in, to the code repository, computing code that is undergoing development and, in response to receiving the second request, access the distributed register/ledger to determine a current operating status for each of the plurality of entities associated with the computing environment. Further, the instructions are configured to determine computing environment stability for developing computing code based on the current operating status of each of the plurality of entities associated with the computing environment. In addition, the instructions are configured to, in response to determining that the computing environment stability meets a second requisite threshold for checking-in computing code undergoing development, check-in the computing code to the code repository.

In other specific embodiments of the system, the instructions configured to determine computing environment stability are further configured to determine a computing environment stability score based on applying predetermined weighting factors to the current operating status of each of the plurality of entities associated with the computing environment. In such embodiments of the system, the predetermined weighting factors indicate a level significance of the entity in the overall computing environment stability. In related embodiments of the system, the instructions are further configured to determine that the computing environment stability score meets or exceeds a first requisite computing environment stability score threshold for testing computing code.

In further specific embodiments of the system, the entities/factors associated with the computing environment include a plurality of application servers supporting development and testing of computing code. In further specific embodiments of the system, the entities/factors associated with computing environment stability include one or more of (i) server scanning applications configured to scan the plurality of application servers for certification and security compliance, (ii) equipment configured to monitor physical locations at which the application servers reside, (iii) external entities configured to report on operation existence of one or more of the plurality of application servers, (iv) one or more upstream component monitors configured to signal servers and Application Programming Interfaces (APIs) that upstream to the plurality of application servers to insure current availability, and (v) one or more software installers configured to package computing code updates in an operating system-specific format, store the packaged code in a centralized location.

In still further specific embodiments of the system, the nodes in the distributed trust computing network are dynamically interchangeable to provide for the instructions to be further configured to dynamically add to or subtract from the plurality of entities/factors associated with the computing environment used to determine the computing environment stability.

A computer-implemented method for assuring computing environment stability for developing and testing computing code defines second embodiments of the invention. The method is executed by one or more processing devices. The method includes receiving a first request from a user to retrieve computing code from the code repository for purposes of testing the computing code. The method further includes, in response to receiving the first request, accessing a distributed register/ledger to determine a current operating status for each of the plurality of entities associated with the computing environment. The distributed register/ledger is accessible to or stored within a distributed trust computing network that includes a plurality of decentralized nodes. Each node is associated with one of a plurality of entities associated with the computing environment. The distributed register/ledger stores data blocks, each data block storing data associated with an operating status of one of the plurality of entities associated with the computing environment. In addition, the method includes determining computing environment stability for testing computing code based on the current operating status of each of the plurality of entities associated with the computing environment. Moreover, the method includes, in response to determining that the computing environment stability meets a first requisite threshold for testing computing code, retrieving the computing code from a code repository and presenting to the user for purposes of testing the computing code.

In specific embodiments the method further includes receiving a second request from a user to check-in, to the code repository, computing code that is undergoing development. In such embodiments the method further includes, in response to receiving the second request, accessing the distributed register/ledger to determine a current operating status for each of the plurality of entities associated with the computing environment and determining computing environment stability for developing computing code based on the current operating status of each of the plurality of entities associated with the computing environment. In addition, in such embodiments the method includes, in response to determining that the computing environment stability meets a second requisite threshold for checking-in computing code undergoing development, checking-in the computing code to the code repository.

In other specific embodiments of the method, determining computing environment stability further includes determining a computing environment stability score based on applying predetermined weighting factors to the current operating status of each of the plurality of entities associated with the computing environment. The predetermined weighting factors indicate a level significance of the entity/factor in determining the computing environment stability.

In further specific embodiments of the method, the entities/factors associated with the stability of the computing environment include a plurality of application servers supporting development and testing of computing code and at least one of (i) one or more security patch agents configured for execution on the plurality of application servers to insure immediate security patch updates, (ii) server scanning applications configured to scan the plurality of application servers for certification and security compliance, (iii) equipment configured to monitor physical locations at which the application servers reside, (iv) external entities configured to report on operation existence of one or more of the plurality of application servers, (v) one or more upstream component monitors configured to signal servers and Application Programming Interfaces (APIs) that upstream to the plurality of application servers to insure current availability, and (vi) one or more software installers configured to package computing code updates in an operating system-specific format, store the packaged code in a centralized location.

A computer program product including non-transitory computer-readable medium defines third embodiments of the invention. The computer-readable medium includes a first set of codes configured to cause a computer processor device to receive a first request from a user to retrieve computing code from the code repository for purposes of developing or tester the computing code. The computer-readable medium additionally includes a second set of codes configured to cause a computer processor device to, in response to receiving the first request, access a distributed register/ledger to determine a current operating status for each of the plurality of entities associated with the computing environment. The distributed register/ledger is accessible to or stored within a distributed trust computing network comprising a plurality of decentralized nodes. Each node is associated with one of a plurality of entities/factors that are determinative in computing environment stability. The distributed register/ledger stores data blocks, each data block storing data associated with an operating status of one of the plurality of entities associated with the computing environment. The computer-readable medium additionally includes a third set of codes for causing a computer processor device to determine computing environment stability for developing or testing computing code based on the current operating status of each of the plurality of entities associated with the computing environment. Moreover, the computer-readable medium includes a fourth set of codes for causing a computer processor device to, in response to determining that the computing environment stability meets a first requisite threshold for developing computing code or a second requisite threshold for testing computing code, retrieve the computing code from a code repository and present to the user for purposes of developing or testing the computing code.

In specific embodiments of the computer program product, the computer-readable medium includes (i) a fifth set of codes for causing a computer processor device to, receive a second request from a user to check-in, to the code repository, computing code that is undergoing development, (ii) a sixth set of codes for causing a computer processor device to, in response to receiving the second request, access the distributed register/ledger to determine a current operating status for each of the plurality of entities associated with the computing environment, (iii) a seventh set of codes for causing a computer processing device to determine computing environment stability for developing or testing computing code based on the current operating status of each of the plurality of entities associated with the computing environment, and (iv) an eighth set of codes for causing a computing device to, in response to determining that the computing environment stability meets a third requisite threshold for checking-in computing code undergoing development, checking-in the computing code to the code repository.

In further specific embodiments of the computer program product, the third set of codes is further configured to cause the computer processor device to determine a computing environment stability score based on applying predetermined weighting factors to the current operating status of each of the plurality of entities associated with the computing environment, wherein the predetermined weighting factors indicate a level significance in the computing environment stability.

In other specific embodiments of the computer program product, the entities/factors determinative of computing environment stability include a plurality of application servers supporting development and testing of computing code and at least one of (i) one or more security patch agents configured for execution on the plurality of application servers to insure immediate security patch updates, (ii) server scanning applications configured to scan the plurality of application servers for certification and security compliance, (iii) equipment configured to monitor physical locations at which the application servers reside, (iv) external entities configured to report on operation existence of one or more of the plurality of application servers, (v) one or more upstream component monitors configured to signal servers and Application Programming Interfaces (APIs) that upstream to the plurality of application servers to insure current availability, and (vi) one or more software installers configured to package computing code updates in an operating system-specific format, store the packaged code in a centralized location.

Thus, systems, apparatus, methods, and computer program products herein described in detail below provide implementing a distributed register/ledger for indicating current status/state of computing environment entities/factors for determining an overall stability of the computing environment. The overall stability of the computing environment is the determinative factor in whether or not computing code/software testers are provided access to computing code for testing purposes and/or computing code/software developers are allowed to check-in code after it has been edited/changed.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
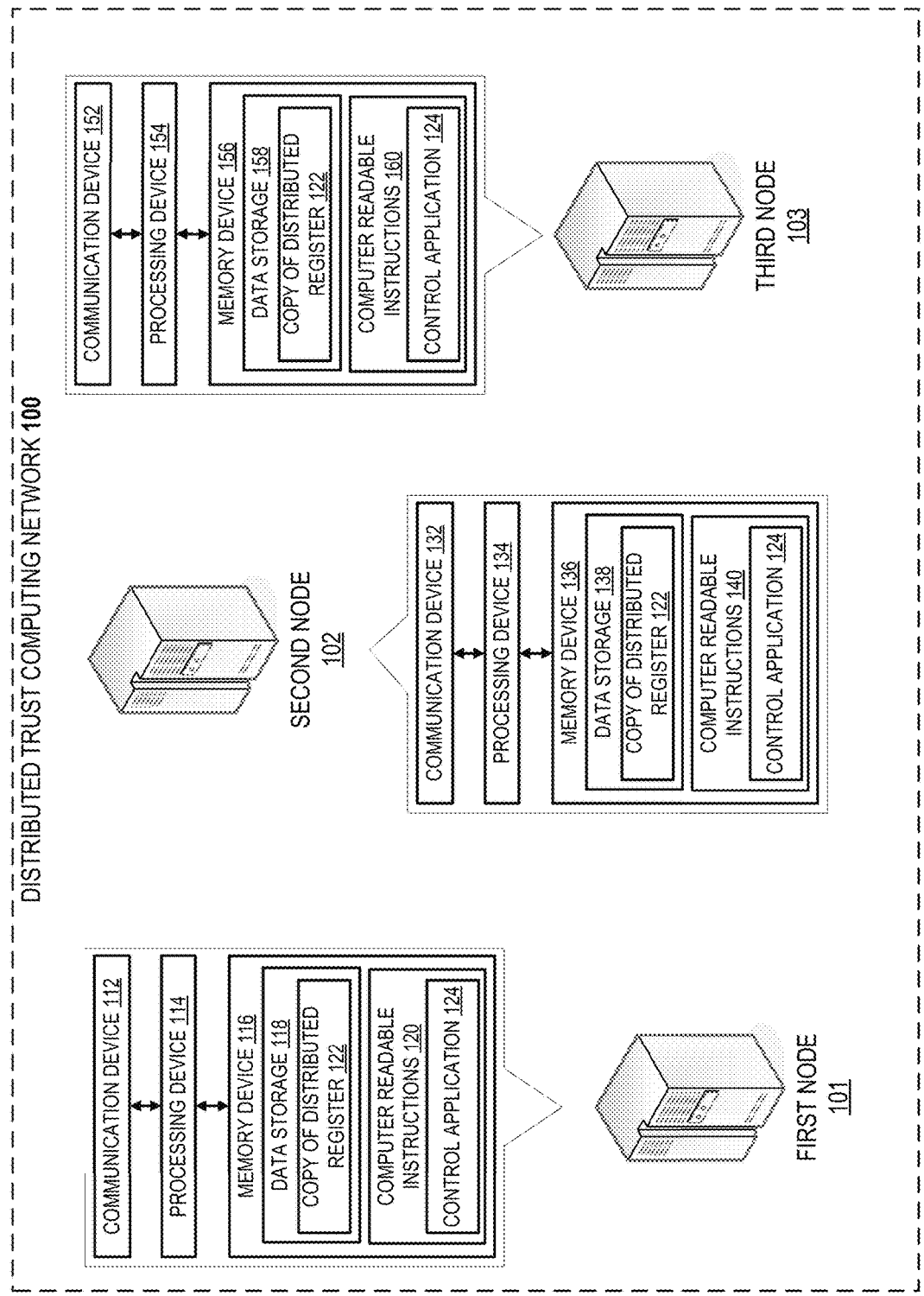
Figure 2:
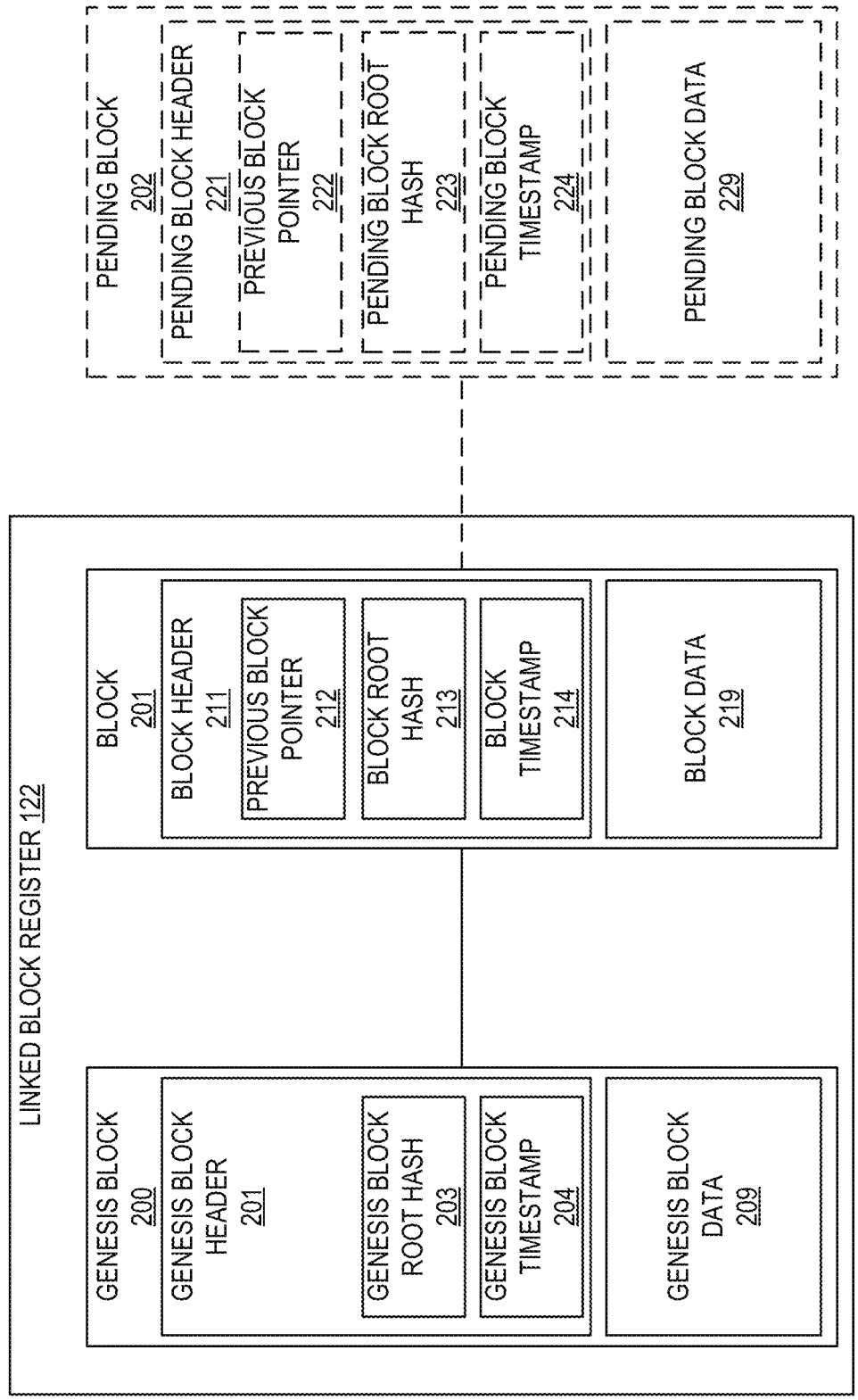
Figure 3:
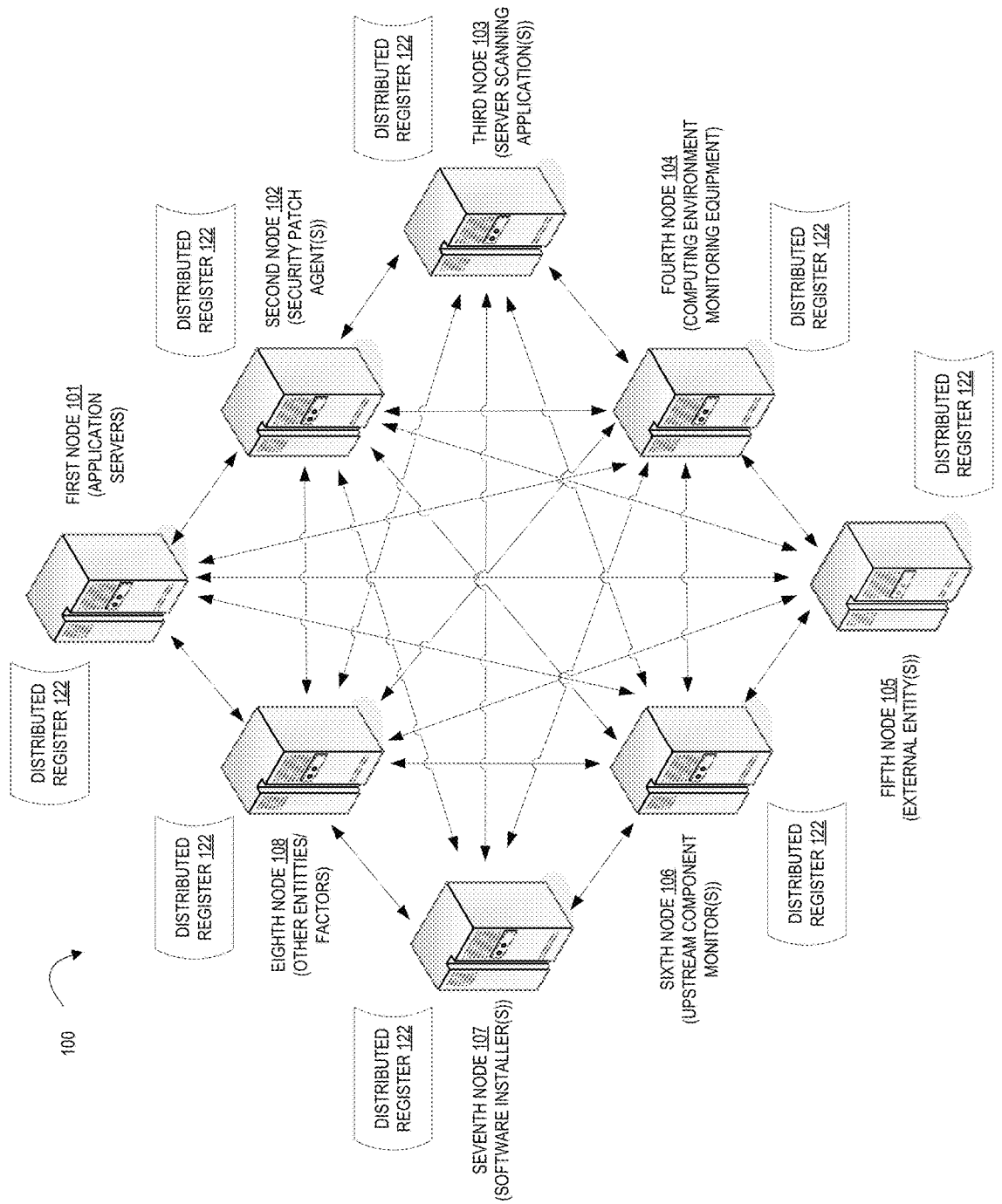
Figure 4:
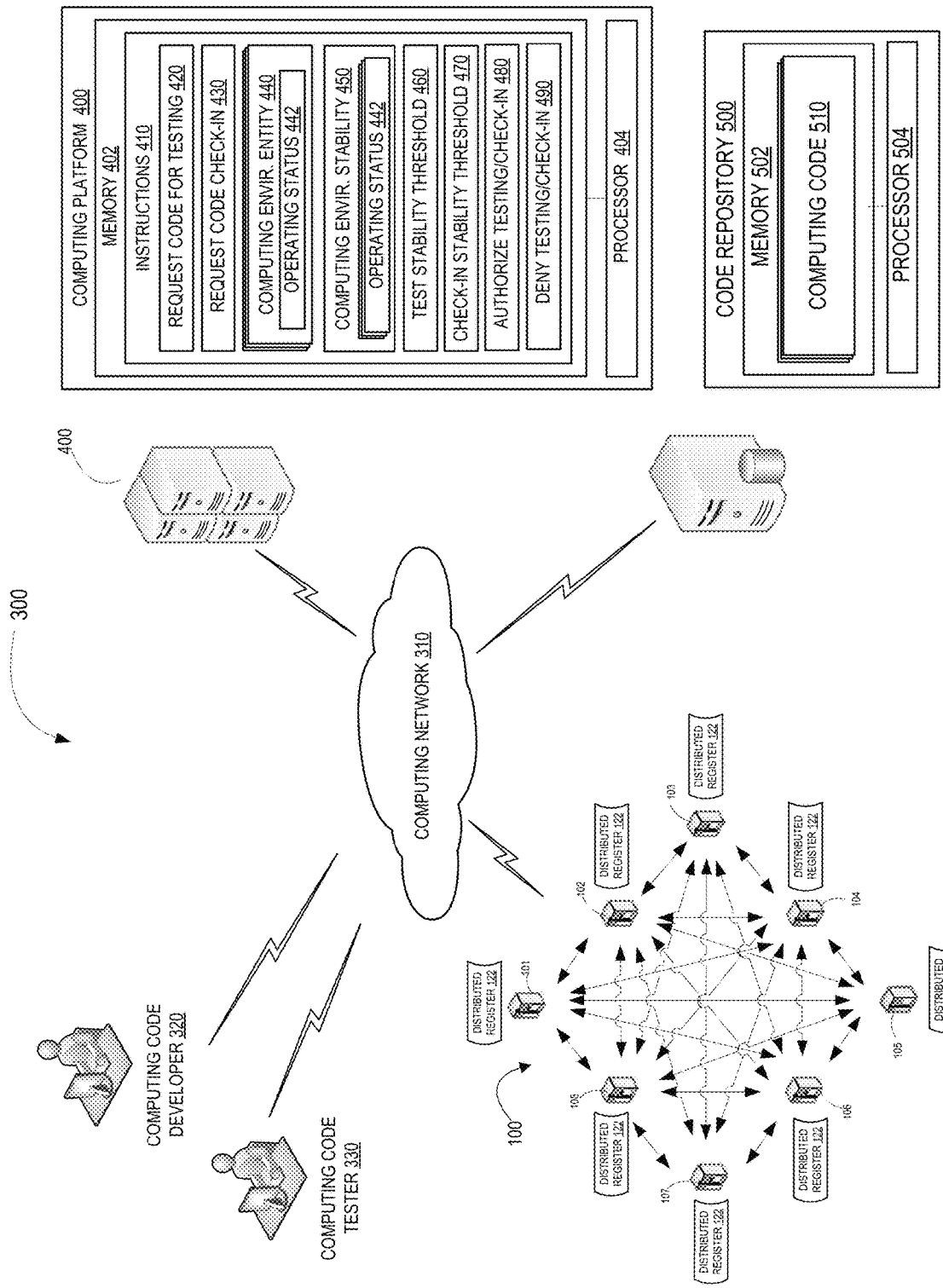
Figure 5:
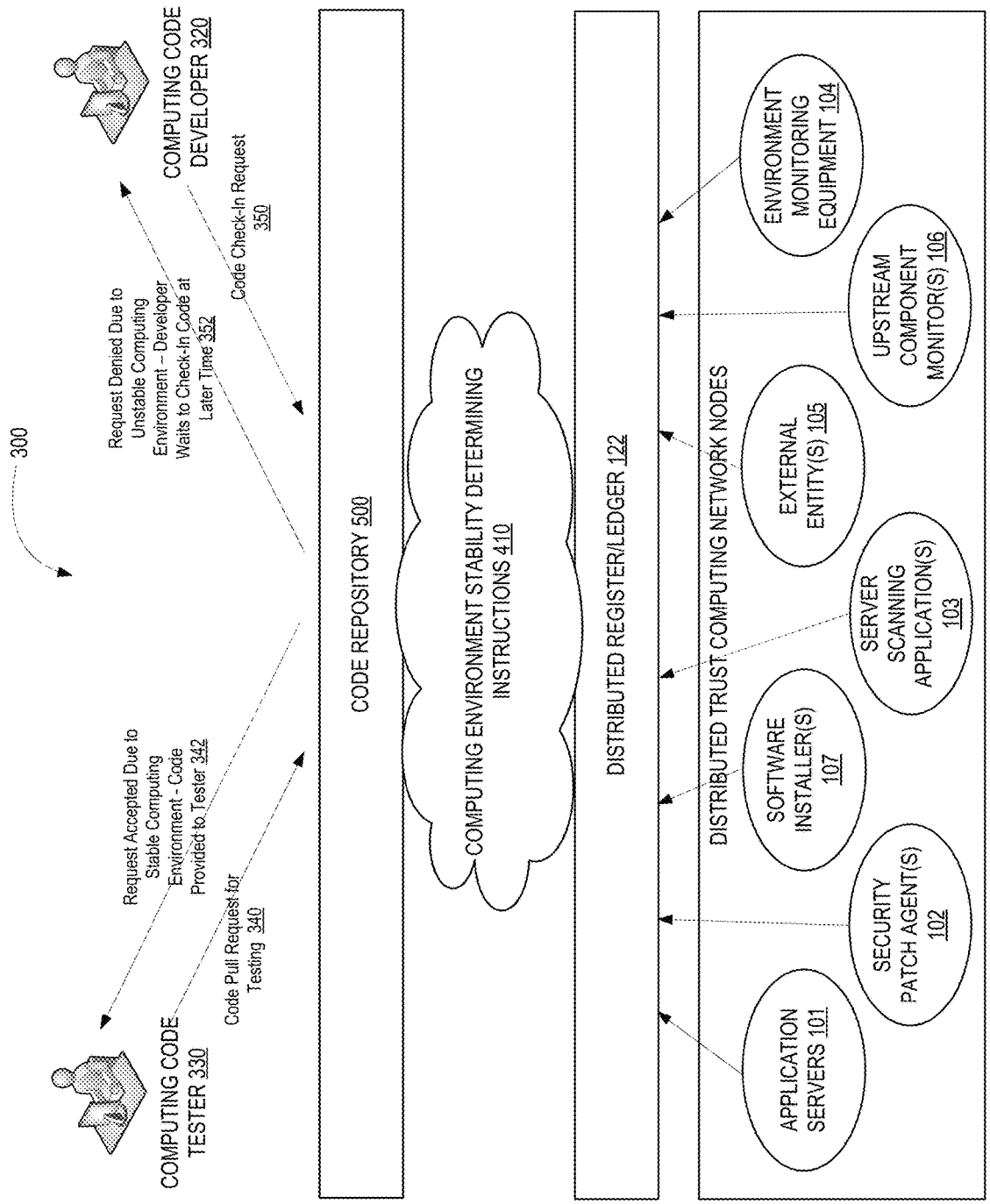
Figure 6:
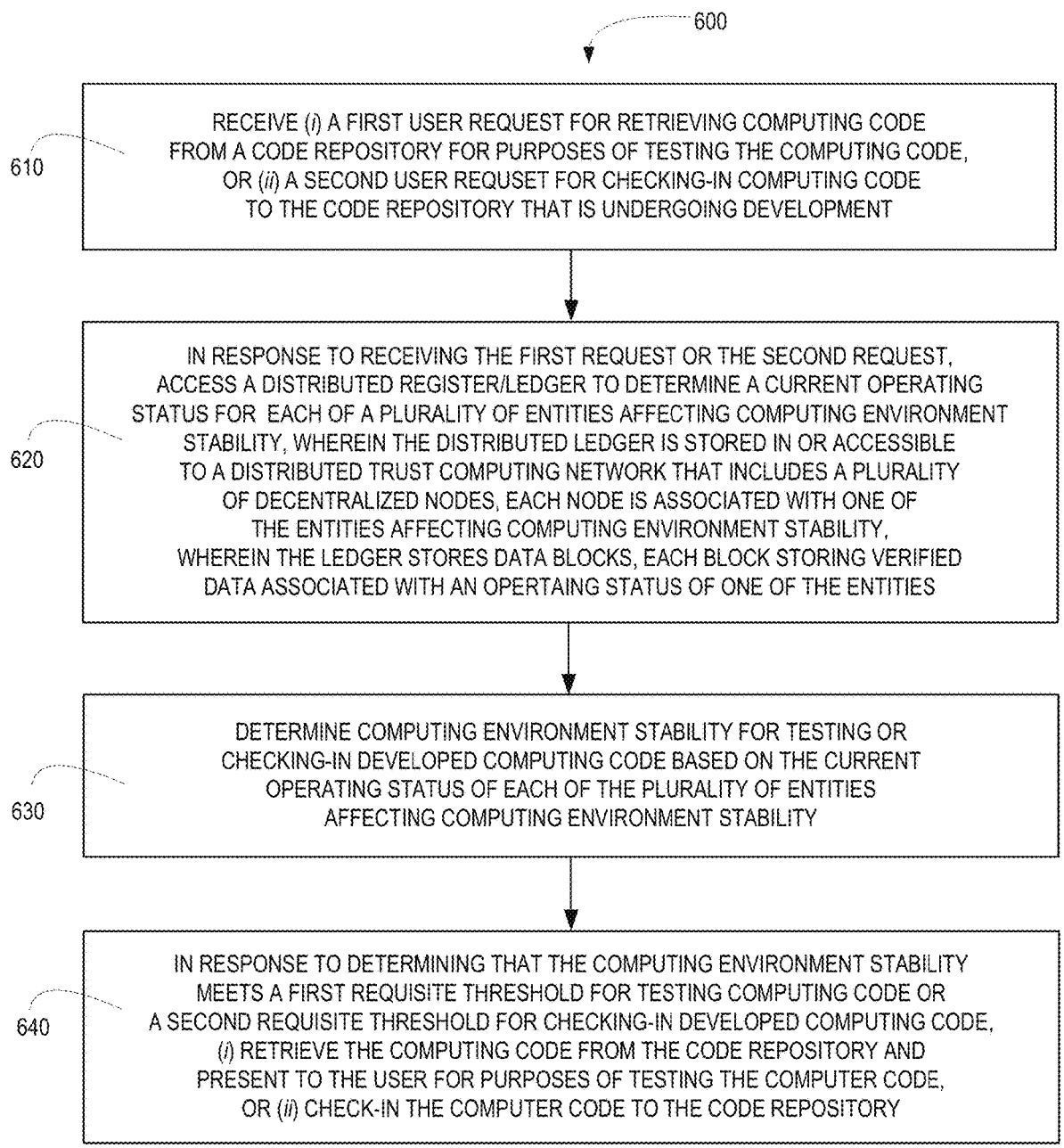

Having thus described embodiments of the invention in general terms, reference will now be made the accompanying drawings, wherein:

FIG. 1 is a schematic/block diagram of a distributed trust computing network, in accordance with embodiments of the present disclosure;

FIG. 2 is a schematic/block diagram of a distributed register/ledger, in accordance with embodiments of the present invention;

FIG. 3 is a schematic diagram of a specific distributed trust computing network in which the nodes are associated with individual computing environment entities that are factors in determining computing environment stability, in accordance with embodiments of the present invention;

FIG. 4 is a schematic diagram of a system for controlling access to computing code for testing and checking-in of computing being developed through use of a distributed trust computing network, in accordance with embodiments of the present invention;

FIG. 5 is another schematic/block diagram of a system for controlling access to computing code for testing and checking-in of computing being developed through use of a distributed trust computing network, in accordance with embodiments of the present invention; and FIG. 6 is a flow diagram of method for controlling access to computing code for testing and checking-in of computing being developed through use of a distributed trust computing network, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for controlling access to computing code being tested and/or the checking-in of computing code being developed or edited based the overall stability of the computing environment in which the testing will occur or the code will be checked into. Specifically, present embodiments of the invention, leverage the use of a distributed trust computing network in which the various decentralized nodes are each associated with a different entity or factor that has an effect on the computer network stability. The various nodes of the distributed trust ledger will provide operational status data, which is verified for authenticity through consensus established by a plurality of the nodes and forms the data blocks of a distributed register.

In response to a tester requesting access to computing code/software or a developer requesting the checking-in of computing code/software edits, the distributed register/ledger is accessed to determine the current operational status of the various nodes and a determination is made as to the overall stability of the computing environment based on the current operational status of the various nodes. If the computing environment is determined to meet a specified level of overall computing environment stability, the tester is granted access to the code for testing purposes or, in other embodiments of the invention, the developer is allowed to check-in their edits to the code.

Thus, the present invention serves to eliminate the inefficiency problems that exist when code/software is attempted to be tested in an unstable computing environment and when edited code/software is checked-in to an unstable computing environment.

"Computing environment" as used herein refers to the various computing apparatus and devices, including software executing on such apparatus and devices that are used for software testing.

"Computing environment entity" as used herein refers to various apparatus, devices, software applications, external entities that affect or otherwise are factors in the stability of the computing environment.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

"User" as used herein refers to an individual who may interact with the system to access the functions therein. Specifically, according to embodiments of the present invention, a user may be individual that tests computing code (i.e., a computing code/software tester) or an individual that develops computing code, such as writes new code or edits existing code (i.e., a computing code/software developer). Accordingly, the user may be an agent, employee, associate, contractor, or other authorized party who may access, use, administrate, maintain, and/or manage the computing systems within the computing system. In other embodiments, the user may be a client or customer of the entity.

"Distributed trust computing network" otherwise commonly referred to as a blockchain network, as used herein refers to a network of decentralized computing devices, referred to as nodes. The nodes are configured to converge, otherwise referred to as come to a consensus, on data that is being added to a distributed register/ledger hosted within the distributed trust computing network to verify the authenticity of such data (i.e., the trust computing network acts as a source of truth). Once authenticated the data forms a data block which is added to the distributed register/ledger.

"Distributed register," which is also be referred to as a "distributed register/ledger," as used herein refers to a structured list of data records that is decentralized and distributed amongst a plurality of computing systems and/or devices. In some embodiments, the distributed register/ledger may use a linked block structure, commonly referred to as a block chain.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block register" may refer to a distributed register/ledger which uses linked block data structures. Generally, a linked block register is an "append only" ledger in which the data within each block within the linked block register may not be modified after the block is added to the linked block register; data may only be added in a new block to the end of the linked block register. In this way, the linked block register may provide a practically immutable ledger of data records over time.

"Permissioned distributed register" as used herein may refer to a linked block register for which an access control mechanism is implemented such that only known, authorized users may take certain actions with respect to the linked block register (e.g., add new data records, participate in the consensus mechanism, or the like). Accordingly, "unpermissioned distributed register" as used herein may refer to a linked block register without an access control mechanism.

"Private distributed register" as used herein may refer to a linked block register accessible only to users or devices that meet specific criteria (e.g., authorized users or devices of a certain entity or other organization). Accordingly, a "public distributed register" is a linked block register accessible by any member or device in the public realm. In the present invention, a private distributed register/ledger is implemented in which only authorized users or devices have access to the information stored on the distributed register/ledger "Node" as used herein may refer to a computing system on which the distributed register/ledger is hosted. In some embodiments, each node maintains a full copy of the distributed register/ledger. In this way, even if one or more nodes become unavailable or offline, a full copy of the distributed register/ledger may still be accessed via the remaining nodes in the distributed trust computing network. That said, in some embodiments, the nodes may host a hybrid distributed register/ledger such that certain nodes may store certain segments of the linked block register but not others. Specific to the present invention, each node in the distributed trust computing network is associated with a computing environment entity that is determinative of the computing environment stability.

"Consensus," "consensus algorithm," or "consensus mechanism" as used herein may refer to the process or processes by which nodes come to an agreement, otherwise referred to as converge, with respect to the contents of the distributed register. Changes to the register (e.g., addition of data records) may require consensus to be reached by the nodes in order to become a part of the authentic version of the register. In this way, the consensus mechanism may ensure that each node maintains a copy of the distributed register/ledger that is consistent with the copies of the distributed register/ledger hosted on the other nodes; if the copy of the distributed register/ledger hosted on one node becomes corrupted or compromised, the remaining nodes may use the consensus algorithm to determine the "true" version of the distributed register/ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

Accordingly, the system as described herein may comprise a private distributed register/ledger hosted on multiple nodes, where each node hosts copies of the private distributed register/ledger. The private distributed register/ledger may comprise application data and/or metadata as described above. Each node may be operated by a person or entity having different roles with respect to any particular application. For example, with respect to the present invention, each node is associated with a different computing environment entity or application that is determinative in the overall computing environment stability. Each of the nodes may then submit data with respect to the entity with which they are associated.

Once each of the nodes has inputted their data, the distributed trust computing network, based on the identity of the node, validates the data inputted by the nodes via a consensus algorithm. In this regard, certain nodes may be given more weight by the algorithm than others. In such embodiments, the consensus algorithm may be a Proof-of-Stake mechanism. If the distributed trust computing network successfully validates the input data, the system may append a data record containing the results of the validation process to the private distributed register/ledger. In this way, the system may maintain an immutable, persistent log of records with respect to its entities/applications.

The system as described herein confers a number of technological advantages over conventional application control systems. For instance, by storing computing environment entity status information within the distributed register/ledger, the system may avoid the creation of invalid or inaccurate data which may lead to issues with system resources, performance, and/or security.

Turning now to the figures, FIG. 1 illustrates a distributed trust computing network 100, in accordance with one embodiment of the present disclosure. In particular, FIG. 1 illustrates a first node 101, a second node 102, and a third node 103 within a distributed trust computing network 100, where each of the nodes 101, 102, 103 host a copy of a distributed register/ledger 122, as will be described in further detail below. The nodes 101, 102, 103 within the distributed trust computing network 100 may be communicatively coupled with one another such that the nodes may send data to and receive data from the other nodes within the distributed trust computing network 100. It should be understood that FIG. 1 illustrates only an exemplary embodiment of the operating environment of a distributed trust computing network 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though FIG. 1 depicts three nodes 101, 102, 103, the distributed trust computing network 100 may comprise a fewer or greater number of nodes according to the implementation of the system described herein.

The network may be a system specific distributive trust computing network receiving and distributing specific network feeds and identifying specific network associated triggers. The network includes one or more cellular radio towers, antennae, cell sites, base stations, telephone networks, cloud networks, radio access networks (RAN), WIFI networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first node 101 may be a part of the distributed trust computing network 100. In this regard, the first node 101 may be, for example, a networked terminal, server, desktop computer, or the like, though it is within the scope of the disclosure for the first node 101 to be a portable device such as a cellular phone, smart phone, smart device, personal data assistant (PDA), laptop, or the like. The first node 101 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WIFI or Ethernet adapter, radio transceiver, or other device for communicating with other devices on the network.

The memory device 116 comprises computer-readable instructions 120 and data storage 118, where the data storage 118 may comprise a copy of the distributed register/ledger 122. The distributed register/ledger (and the copy of the distributed register/ledger 122) may comprise a series of data records (i.e., data blocks) relevant to the objectives of the distributed trust computing network 100. For instance, the distributed register/ledger may comprise a series of data records which may contain data and/or metadata associated with the operating status of one of the computing environment entities. In this regard, the computer-readable instructions 120 may have a control application 124 stored thereon, where the control application 124 may comprise an application governance tool through which the first node 101 may submit information regarding an application and/or a rule or requirement to which the application relates.

As further illustrated in FIG. 1, the second node 102 may also be a part of the distributed trust computing network 100 and comprise a communication device 132, a processing device 134, and a memory device 136. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 132, and other communication devices as described herein, may comprise a wireless local area network (WLAN) such as WIFI based on the Institute of Electrical and Electronics Engineers' (IEEE) 802.11 standards, Bluetooth short-wavelength Ultra High Frequency (UHF) radio waves in the band from 2.4 to 2.485 GHz or other wireless access technology. Alternatively, or in addition to the wireless interface, the systems described herein may also include a communication interface device that may be connected by a hardwire connection to the resource distribution device. The interface device may comprise a connector such as a Universal Serial Bus (USB), Serial Advanced Technology Attachment (SATA), Parallel Advanced Technology Attachment (PATA), Serial Attached SCSI (SAS) or other data connector for transmitting data to and from the respective computing system.

The processing device 134 is operatively coupled to the communication device 132 and the memory device 136. The processing device 134 uses the communication device 132 to communicate with the network and other devices on the network, such as, but not limited to the first node 101 and/or the third node 103. The communication device 132 generally comprises a modem, antennae, WIFI or Ethernet adapter, radio transceiver, or other device for communicating with other devices on the network.

In some embodiments, the memory device 136 may further include data storage 138 which may comprise a copy of the distributed register/ledger 122. The memory device 136 has computer-readable instructions 140 stored thereon, which further comprise the control application 124.

As further illustrated in FIG. 1, the third node 103 may be a part of the distributed trust computing network 100 and comprise a processing device 154 operatively coupled to a communication device 152 and a memory device 156. The memory device 156 may comprise data storage 158 having a copy of the distributed register/ledger 122 stored thereon. The memory device 156 may further comprise computer readable instructions 160 of the control application 124.

The communication devices as described herein may comprise a wireless local area network (WLAN) such as WIFI based on the Institute of Electrical and Electronics Engineers' (IEEE) 802.11 standards, Bluetooth short-wavelength UHF radio waves in the ISM band from 2.4 to 2.485 GHz or other wireless access technology. Alternatively, or in addition to the wireless interface, the third node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in an integrated circuit (i.e., chip).

The integrated circuit may include the necessary circuitry to provide integration within the devices depicted herein. Generally, the integrated circuit will include data storage which may include data associated with the service that the computing systems may be communicably associated therewith. The integrated circuit may be a microprocessor, a system-on-a-chip, a microcontroller, or the like. In this way, the integrated circuit may include data storage. Of note, it will be apparent to those skilled in the art that the integrated circuit functionality may be incorporated within other elements in the devices. For instance, the functionality of the integrated circuit may be incorporated within the memory device and/or the processing device. In a particular embodiment, the functionality of the integrated circuit is incorporated in an element within the devices. Still further, the integrated circuit functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary linked block register/ledger, in accordance with some embodiments of the invention. In particular, FIG. 2 depicts a plurality of blocks 200, 201 within the linked block register/ledger 122, in addition to a pending block 202 that has been submitted to be appended to the linked block register 122. The linked block register/ledger 122 may comprise a genesis block 200 that serves as the first block and origin for subsequent blocks in the linked block register/ledger 122. The genesis block 200, like all other blocks within the linked block register/ledger 122, comprise a block header 201 and block data 209. The genesis block data 209, or any other instances of block data within the linked block register/ledger 122 (or any other distributed register/ledger) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments of the invention, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the linked block register/ledger 122. In some embodiments of the invention, the timestamp may be a Unix timestamp. In some embodiments, particularly in registers/ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the linked block register/ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the register/ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the linked block register/ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the linked block register 122. A pending block timestamp 224 may also be added to signify the time at which the pending block 202 is added to the linked block register 122.

In other embodiments, the consensus mechanism may be based on a total number of ballots submitted by the nodes of the linked block register 122, e.g., a PBFT consensus mechanism. Once a threshold number of ballots to validate the pending block 202 has been reached, the pending block 202 may be appended to the linked block register 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments of the invention, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

Referring to FIG. 3 shown is an exemplary distributed trust computing network 100, in accordance with embodiments of the present invention. The decentralized nodes 101-108 of the distributed trust computing network 100 are associated with a computing environment entity or factor that is determinative of the computer environment stability (i.e., the ability of the computing environment to host computing code testing and/or check-in computing code being developed (i.e., new computing code or revisions to existing computing code). As previously discussed, each of the nodes 101-108 store or have access to at least a portion of the distributed register/ledger 122.

In the example shown in FIG. 3, decentralized nodes include first node 101 that is associated with a plurality of servers that host computing code for testing purposes and/or receive computing code check-ed in by developers. In this regard, first node 101 is configured to report on the operating status of each of the plurality of servers (i.e., whether a server is operational, "up" or whether is a server is currently non-operations, "down"). Decentralized nodes further include second node 102 that is associated with one or more security patch agents. In this regard, second node 102 is configured to report on the operational status of security patch agents executing on servers to ensure that the servers are up-to-date in terms of security patch deployment.

In addition, decentralized nodes include third node 103 that is associated with one or more server scanning applications. In this regards, third node 103 is configured to report on whether server scans have occurred on each of the servers and, in some embodiments of the invention, the results of such scans (i.e., whether a scan resulted in security issues, certifications issues or any other issue that may result in less full operational efficiency). Additionally, decentralized nodes include fourth node 104 that is associated with computing environment monitoring equipment. For example, the monitoring equipment may include equipment that monitors the physical location of the servers, such as atmospheric monitors (e.g., heat measurement, humidity and the like), smoke detectors and the like. In this regard, fourth node 104 is configured to report on the operational status of such computing environment monitoring system and, in some embodiments of the invention, whether current monitored parameters (e.g., heat measurement, humidity) exceed thresholds.

In addition, decentralized nodes include fifth node 105 that is associated with an external entity, for example a police station/bureau or the like. In this regard, fifth node 105 is configured to report on the physical existence or non-existence of one or more servers (e.g., physical misappropriation of one or more servers or the like). Further, decentralized nodes include sixth node 106 that is associated with one or more upstream component monitors configured to signal (i.e., ping) upstream servers and Application Programming Interfaces (API) that are upstream of the plurality of application servers to insure current availability. This of ordinary skill in the art will note that computing code testing not only involves the servers on which the code is executed but also involves interactions with other systems (i.e., other servers and APIs running on such servers). In this regard, sixth node 106 is configured to report on the operational status of the upstream component monitors and, in some embodiments, the current results of such signaling (i.e., whether upstream components are fully operational or, if not, the percentage of upstream components that are operational).

Moreover, decentralized nodes include seventh node 107 that is associated with one or more software installers, which serves to package/format code in an operating-specific format prior to installing code changes on servers. In this regard, seventh node 107 is configured to report on the operational status of the software installer(s) and, in some embodiments of the invention, whether current code changes have been installed on applicable servers.

Additionally, the decentralized nodes may include eighth node 108 that is associated with any other computing environment entity or factor that is applicable to determining computing environment stability. In this regard, nodes may be dynamically added or, in some embodiments of the invention, subtracted from the distributed trust computing network as new entities/factors are added or other entities/factors become obsolete.

Referring to FIG. 4 a schematic diagram is presented of a system 300 for controlling computing code testing and check-in of computing code undergoing development, in accordance with embodiments of the present invention. As previously discussed, the system 300 includes a distributed trust computing network 100 that includes a plurality of decentralized nodes 101-108, with each node being associated with a computing environment entity of factor that assists in the determination of computing environment stability. In this regards, each node 101-108 stores or has access to distributed register/ledger 122 that comprises a plurality of data blocks. Each data block stored verified operating status data associated with one of the plurality of computing environment entities. As previously discussed, the distributed trust computing network 100 is beneficial, in that, it provided for the data in the data blocks to be certified/verified, via node consensus, as to the authenticity of the data stored therein.

The system 300 additionally includes a code repository 500 including a memory 502 and at least one processor device 504 in communication with the memory 502. The memory 502 of code repository 500 is configured to store computing code 510, such as computing code 510 that is undergoing testing and/or computing code that is undergoing development (i.e., new computing code or computing code being revised/updated).

Further, system 300 includes computing platform 400, which may comprise one or more devices, such as application server(s) or the like. Computing platform 400 is network communication with distributed trust computing network 100, code repository 500, as well as the workstations or other computing devices used by computing code developer 320 and/or computing code tester 330. The network communication is via conventional computing network 310 which may comprise the Internet, one or more intranets or a combination thereof. Computing platform 400 includes memory 402 and one or more processor devices 404 in communication with the memory 402. Memory 402 may comprise volatile and non-volatile memory, such as read-only and/or random-access memory (RAM and ROM), EPROM, EEPROM, flash cards, or any memory common to computing platforms). Moreover, memory 402 may comprise cloud storage, such as provided by a cloud storage service and/or a cloud connection service.

Processor device 404 may be an application-specific integrated circuit ("ASIC"), or other chipset, logic circuit, or other data processing device configured to execute instructions 410. Processing device(s) 404 may execute one or more application programming interfaces (APIs) (not shown in FIG. 4) that interface with any resident programs, such as instructions 410 or the like stored in the memory 402 of the computing platform 400 and any external programs. Processing device(s) 404 may include various processing subsystems (not shown in FIG. 4) embodied in hardware, firmware, software, and combinations thereof, that enable the functionality of computing platform 400 and the operability of computing platform 400 on the computing network 310. For example, processing subsystems allow for initiating and maintaining communications and exchanging data with other networked devices, such as distributed trust computing network 100, code repository 500, as well as the workstations or other computing devices used by computing code developer 320 and/or computing code tester 330. For the disclosed aspects, processing subsystems of computing platform 400 may include any processing subsystem used in conjunction with instructions 410 and related engines, tools, routines, sub-routines, algorithms, sub-algorithms, sub-modules thereof.

Computing platform 400 may additionally include a communications module (not shown in FIG. 4) embodied in hardware, firmware, software, and combinations thereof, that enables electronic communications between computing platform 400 and other network devices, such as, but not limited to, distributed trust computing network 100, code repository 500, as well as the workstations or other computing devices used by computing code developer 320 and/or computing code tester 330. Thus, communication module may include the requisite hardware, firmware, software and/or combinations thereof for establishing and maintaining a network communication connection with one or more network devices.

The memory 402 of computing platform 400 stores instructions 410, otherwise referred to as software, code, modules routines, tools or the like, which is configured to receive a request 430 from a computing code tester 330 to access/check-out computing code 510 from the code repository 500 for purposes of performing testing on the computing code 510. Further, in other embodiments of the invention, the instructions are configured to receive a request 430 from a computing code developer 320 to check-in computing code 510 that the developer has created and/or edited.

In response to receiving request 420 or 430, the instructions 410 are configured to access the distributed register/ledger 122 of the distributed trust computing network 100 to determine current operating status 442 of each of the plurality of computing environment entities 440. As described in relation to FIG. 3, the entities 440 may include, but are not limited to application server status, security patch agent status, server scanning application status, computing environment monitoring equipment status, external entities, upstream component monitors status, software installers and the like. The current status will be indicative of last-in-time entry in the distributed register/ledger 122 for each of the nodes in the distributed trust computing network 100.

In response to determining current operating status 442 of each of the computing environment entities 440, the instructions 410 are configured to determine the overall computing environment stability 450 based on the current operating status 442 of the computing environment entities. In specific embodiments of the invention, computing environment stability is determined as a numeric score deduced from weighted scores for each of the computing environment entities 440 based on their respective current operating status 442. The weighting schema that is implemented is based on the significance of each computing environment entity as they pertain to stability of the computing environment. For example, application server status will have a high weighting factor based on the significance that most, if not all, servers need to be currently operational in order for the computing environment to deemed stable. In such embodiments of the system 300, the instructions are configured with a testing stability threshold 460 and a check-in stability threshold 470. It should be noted that in specific embodiments of the system 300, the testing stability threshold 460 and the check-in stability threshold 470 are the same threshold, while in other embodiments of the system 300, the testing stability threshold 460 and the check-in stability threshold 470 vary depending the requirements necessary for code testing and development.

In response to determining that the computing environment stability 450 meets or exceeds the requisite test stability threshold 460 or check-in stability threshold 470, the tester 330 or developer 320 is authorized 480 to access the code for testing in the computing environment or check-in the code to the computing environment. In response to determining that the computing environment stability 450 does not meet or exceed the requisite test stability threshold 460 or check-in stability threshold 470, the tester 330 or developer 320 is denied 490 access the code for testing in the computing environment or not allowed to check-in the code to the computing environment. In such instances, the tester 330 or developer 320 must wait until the computing environment is determined to be stable before accessing the code for testing or check-in revisions to code undergoing development.

Referring to FIG. 5, a further schematic diagram is depicted of a system 300 for controlling testing access to computing code and code development check-in based on the stability of the computing environment. As previously discussed, the nodes of the distributed trust computing network are associated with different computing environment entities or factors that influence the stability of the computing environment in which testing occurs. In specific embodiments of the invention, the nodes may include, but are not limited to, application server node 101, security patch agent(s) node 102, server scanning application(s) 103, physical environment monitoring equipment 104, external entity(s) 105, upstream component monitor(s) 106, software installers 107 and the like. In specific embodiments of the invention, the applications that monitor the operational status of the computing environment entities are executed directly on the nodes, while in other embodiments of the invention, the applications that monitor the operational status are executed externally and the operational status is communicated to the corresponding node on a scheduled basis, on demand (e.g., when a request to test or check-in code is received) or the like.

The operational status of each of the nodes is stored in data blocks within the distributed register/ledger 122 that is accessible to or stored within the distributed trust computing network 100.

As shown in FIG. 5, a computing code tester 330 may input a request 340 to pull/access computing code that is stored in data repository 500. In response to the request 340, instructions 410, which in the illustrated embodiments of FIG. 5 are stored and executed in a cloud computing environment, are configured to access the distributed register/ledger 122 to determine the current operational status of each of the computing environment entities (i.e., each of the nodes of the distributed trust computing network). The current operation status may include whether the corresponding devices, applications, monitors or the like are currently functional (i.e., up and running) and, in some embodiments of the invention, the results of the most recent monitoring, installation or the like. In specific embodiments of the invention, determining the current operational status includes reading data from the last-in-time data block associated with each of the nodes (i.e., each of the computing environment entities). Since the data has been stored as data block within the distributed register/ledger it is known to have been verified through a consensus process by the distributed trust computing network and, therefore, the operational status is deemed to authentic and accurate.

In response to determining the operational status of each the computing environment entities, the instructions 410 are configured to determine overall computing environment stability. In specific embodiments of the invention, computing environment stability is a cumulative score based on applying a weighting scheme to the operational status of each computing environment entity. The weighting scheme takes into account the fact that certain computing environment entities are more significant than others in determining the stability of the computing environment. In response to determining that the computing environment stability meets or exceeds a requisite stability threshold, the request 340 is accepted 342 and the computing code tester 330 is authorized to pull/access the computing code from the code repository 500 for purposes of testing. In alternate embodiments of the invention in which the computing environment stability fails to meet the requisite stability threshold, the request 340 to pull/access the computing code from the code repository 500 is denied (not shown in FIG. 5) and the computing code tester 330 waits until the requisite threshold/level of computing environment stability is reached before being authorized to pull/access the computing code.

Also as shown in FIG. 5, a computing code developer 320 may input a request 350 to check-in code to the data repository 500. In response to the request 350, instructions 410, are configured to access the distributed register/ledger 122 to determine the current operational status of each of the computing environment entities (i.e., each of the nodes of the distributed trust computing network). In response to determining the operational status of each the computing environment entities, the instructions 410 are configured to determine overall computing environment stability. In response to determining that the computing environment stability does not meet a requisite threshold of stability, the request 350 is denied 352 from checking-in the computing code to the code repository 500 and the computing code developer 320 must wait, until a later point in time, to check-in the edits/revisions to the computing code. In alternate embodiments of the invention in which the requisite threshold of stability is met or exceeded, the request 350 is be accepted (not shown in FIG. 5) and the computing code is checked-in to the code repository 500.

Referring to FIG. 6 a flow diagram is depicted of a method 600 for controlling testing of computing code and check-in of computing code undergoing development based on computing environment stability, in accordance with embodiments of the present invention. At Event 610, a first user request is received for retrieving computing code from a code repository for purposes of testing the computing code. Alternatively, according to other embodiments of the invention, a second user request is received for checking-in computing code to the code repository that is undergoing development (i.e., new code being written or revisions/updates to existing computing code).

In response to receiving the first user request or the second user request, at Event 620, a distributed register/ledger is accessed to determine the current operating status for each of a plurality of computing environment entities that affect computing environment stability. The distributed register/ledger is stored in or accessible to a distributed trust computing network, such as a block chain network, that includes a plurality of decentralized nodes. Each node is associated with a corresponding one of the computing environment entities. The distributed register/ledger stores data blocks of verified data associated with the operating status of a corresponding computing environment entity.

As described previously, the computing environment entities 440 may include, but are not limited to application server, security patch agent(s), server scanning application(s), computing environment monitoring equipment, external entities, upstream component monitor(s), software installer(s) and the like. The current operating status will be indicative of last-in-time data block in the distributed register/ledger for each of the nodes in the distributed trust computing network.

In response to determining current operating status for each of the computing environment entities, at Event 630, an overall computing environment stability is determined based on the current operating status of the computing environment entities. In specific embodiments of the invention, computing environment stability is determined as a numeric score deduced from weighted scores for each of the computing environment entities based on their respective current operating status. As previously discussed, the weighting schema is based on the significance of each computing environment entity in relation to stability of the computing environment.

In response to determining that the computing environment stability meets or exceeds a first requisite threshold for testing computing code or, alternatively, meets or exceeds a second requisite threshold for checking-in developed computing code, at Event 640, the computing code is retrieved from the code repository and presented to the user for purposes of testing the computing code. Alternatively, the computing code is checked-in into the code repository. In the event that computing environment stability is determined to not meet the first requisite threshold for testing computing code or, alternatively, the second requisite threshold for checking-in computing code, access to the computing code or the checking-in of the computing code is denied. In such instances, a user must wait until the computing environment stability meets the requisite threshold before accessing the computing code for testing or checking-in developed computing code to the code repository.

As evident from the preceding description, the systems, methods and the like described herein represents an improvement in technology, specifically, embodiments of the present invention provide for controlling access to computing code for testing purposes and the check-in of computing code being developed based on the overall stability of the computing environment. Thus, the present invention assures that testing of computing code and the check-in of developed computing code only occurs when the computing environment is stable. Further, the present invention leverages a distributed register/ledger in a distributed trust computing network to verify the authenticity of the operating status of the various entities that influence computer environment stability. As result, the computing environment stability, which is determined based on the operating status of the various entities, is deemed to be verifiably authentic and accurate.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method for assuring computing environment stability for developing and testing computing code, the method executed by one or more processing devices and comprising:

receiving a first request to retrieve a computing code from amongst a plurality of computing codes stored in a code repository for purposes of testing the computing code in a computing environment;

in response to receiving the first request, accessing a distributed register/ledger to determine a current operating status for each of a plurality of entities associated with the computing environment, wherein the plurality of entities include a plurality of application servers supporting development and testing of computing code, wherein the distributed register/ledger is accessible to or stored within a distributed trust computing network comprising a plurality of decentralized nodes, each node is associated with one of the plurality of entities associated with the computing environment and wherein the distributed register/ledger stores data blocks, each data block storing data associated with an operating status of one of the plurality of entities associated with the computing environment;

determining a computing environment stability score for testing computing code based on applying predetermined weighting factors to the current operating status of each of the plurality of entities associated with the computing environment, wherein the predetermined weighting factors indicate a level significance in the computing environment stability;

determining that the computing environment stability score meets or exceeds a first requisite computing environment stability score threshold for testing computing code;

in response to determining that the computing environment stability score meets the first requisite computing environment stability threshold for testing computing code, retrieving the computing code from the code repository and presenting the computing code for purposes of testing the computing code;

receiving a second request to check-in, to the code repository, a computing code that is undergoing development;

in response to receiving the second request, accessing the distributed register/ledger to determine the current operating status for each of the plurality of entities associated with the computing environment;

determining computing environment stability for developing computing code based on the current operating status of each of the plurality of entities associated with the computing environment; and in response to determining that the computing environment stability meets a second requisite threshold for checking-in computing code undergoing development, check-in the computing code that is undergoing development to the code repository, wherein the nodes in the distributed trust computing network are dynamically interchangeable to provide for the computer-implemented method to dynamically add to or subtract from the plurality of entities associated with the computing environment used to determine the computing environment stability.

2. The computer-implemented method of claim 1, wherein the entities associated with the computing environment further include at least one of (i) one or more security patch agents configured for execution on the plurality of application servers to insure immediate security patch updates, (ii) server scanning applications configured to scan the plurality of application servers for certification and security compliance, (iii) equipment configured to monitor physical locations at which the application servers reside, (iv) external entities configured to report on operation existence of one or more of the plurality of application servers, (v) one or more upstream component monitors configured to signal servers and Application Programming interfaces (APIs) that upstream to the plurality of application servers to insure current availability, and (vi) one or more software installers configured to package computing code updates in an operating system-specific format, store the packaged code in a centralized location.

3. A system for assuring computing environment stability for developing and testing computing code, the system comprising:

a distributed trust computing network comprising a plurality of decentralized nodes, each decentralized node (i) is associated with one of a plurality of entities associated with a computing environment, wherein the plurality of entities include a plurality of application servers supporting development and testing of computing code, and (ii) comprises a first memory and including at least one first processor in communication with the first memory, wherein the first memory of the decentralized nodes is configured to store a distributed register/ledger comprising a plurality of data blocks, each data block storing data associated with an operating status of one of the plurality of entities associated with the computing environment, wherein the distributed trust computing network is configured to certify that the data stored in the data blocks is authentic;

a code repository including a second memory configured to store a plurality of computing codes; and a computing platform in communication with or disposed in the distributed trust computing network and including a third memory and at least one second processor in communication with the third memory, wherein the third memory stores instructions that are executable by the second processor and configured to:

receive a first request to retrieve a computing code from amongst the plurality of computing codes stored in the code repository for purposes of testing the computing code, in response to receiving the first request, access the distributed register/ledger to determine a current operating status for each of the plurality of entities associated with the computing environment, determine a computing environment stability score for testing of computing code based on applying predetermined weighting factors to the current operating status of each of the plurality of entities associated with the computing environment, wherein the predetermined weighting factors indicate a level significance in the computing environment stability, determine that the computing environment stability score meets or exceeds a first requisite computing environment stability score threshold for testing computing code, in response to determining that the computing environment stability score meets the first requisite computing environment stability threshold for testing of computing code, retrieve the computing code from the code repository and present the computing code for purposes of testing the computing code within the computing environment, receive a second request to check-in, to the code repository, a computing code that is undergoing development, in response to receiving the second request, access the distributed register/ledger to determine the current operating status for each of the plurality of entities associated with the computing environment, determine a computing environment stability score for developing computing code based on the current operating status of each of the plurality of entities associated with the computing environment, and in response to determining that the computing environment stability meets a second requisite threshold for checking-in computing code undergoing development, check-in the computing code that is undergoing development to the code repository, wherein the nodes in the distributed trust computing network are dynamically interchangeable to provide for the instructions to be further configured to dynamically add to or subtract from the plurality of entities associated with the computing environment used to determine the computing environment stability.

4. The system of claim 3, wherein the computing entities include one or more security patch agents configured for execution on the plurality of application servers to ensure immediate security patch updates.

5. The system of claim 3, wherein the computing entities include one or more server scanning applications configured to scan the plurality of application servers for certification and security compliance.

6. The system of claim 3, wherein the entities associated with the computing environment include equipment configured to monitor physical locations at which the application servers reside.

7. The system of claim 3, wherein the entities associated with the computing environment include one or more external entities configured to report on physical existence of one or more of the plurality of application servers.

8. The system of claim 3, wherein the entities associated with the computing environment include one or more upstream component monitors configured to signal servers and Application Programming Interfaces (APIs) that upstream to the plurality of application servers to insure current availability.

9. The system of claim 3, wherein the entities associated with the computing environment include one or more software installers configured to package computing code updates in an operating system-specific format and install the packaged computing code on the application servers.

10. A computer program product including a non-transitory computer-readable medium that comprise sets of codes configured to cause one or more computer processor devices to:

receive a first request to retrieve a computing code from amongst a plurality of computing codes stored in a code repository for purposes of developing and testing the computing code in a computing environment;

in response to receiving the first request, access a distributed register/ledger to determine a current operating status for each of a plurality of entities associated with the computing environment, wherein the plurality of entities include a plurality of application servers supporting development and testing of computing code, wherein the distributed register/ledger is accessible to or stored within a distributed trust computing network comprising a plurality of decentralized nodes, each node is associated with one of the plurality of entities associated with the computing environment and wherein the distributed register/ledger stores data blocks, each data block storing data associated with an operating status of one of the plurality of entities associated with the computing environment;

determine a computing environment stability score for testing computing code based on applying predetermined weighting factors to the current operating status of each of the plurality of entities associated with the computing environment, wherein the predetermined weighting factors indicate a level significance in the computing environment stability;

determining that the computing environment stability score meets or exceeds a first requisite computing environment stability score threshold for testing computing code;

in response to determining that the computing environment stability score meets the first requisite computing environment stability threshold for testing computing code or a second requisite threshold for testing computing code, retrieve the computing code from a code repository and present the computing code for purposes of developing and testing the computing code;

receive a second request to check-in, to the code repository, a computing code that is undergoing development;

in response to receiving the second request, access the distributed register/ledger to determine a current operating status for each of the plurality of entities associated with the computing environment;

determine computing environment stability for developing and testing computing code based on the current operating status of each of the plurality of entities associated with the computing environment; and in response to determining that the computing environment stability meets a third requisite threshold for checking-in computing code undergoing development, checking-in the computing code that is undergoing development to the code repository, wherein the nodes in the distributed trust computing network are dynamically interchangeable to provide for the sets of codes to be further configured to dynamically add to or subtract from the plurality of entities associated with the computing environment used to determine the computing environment stability.

11. The computer program product of claim 10, wherein the entities associated with the computing environment further include at least one of (i) one or more security patch agents configured for execution on the plurality of application servers to insure immediate security patch updates, (ii) server scanning applications configured to scan the plurality of application servers for certification and security compliance, (iii) equipment configured to monitor physical locations at which the application servers reside, (iv) external entities configured to report on operation existence of one or more of the plurality of application servers, (v) one or more upstream component monitors configured to signal servers and Application Programming Interfaces (APIs) that upstream to the plurality of application servers to insure current availability, and (vi) one or more software installers configured to package computing code updates in an operating system-specific format, store the packaged code in a centralized location.

* * * * *